Feb. 29, 1944.   J. L. BUCKMASTER   2,342,640
OPTICAL TRANSFER INSTRUMENT
Filed March 17, 1943   3 Sheets-Sheet 1

Inventor
James L. Buckmaster
By J. F. Mothershead
Attorney

Feb. 29, 1944.     J. L. BUCKMASTER     2,342,640
OPTICAL TRANSFER INSTRUMENT
Filed March 17, 1943     3 Sheets-Sheet 2

Inventor
James L. Buckmaster
By J. F. Mothershead
Attorney

Feb. 29, 1944.    J. L. BUCKMASTER    2,342,640
OPTICAL TRANSFER INSTRUMENT
Filed March 17, 1943    3 Sheets-Sheet 3

INVENTOR
James L. Buckmaster
BY
ATTORNEY

Patented Feb. 29, 1944

2,342,640

UNITED STATES PATENT OFFICE 2,342,640

OPTICAL TRANSFER INSTRUMENT

James L. Buckmaster, Arlington, Va.

Application March 17, 1943, Serial No. 479,448

15 Claims. (Cl. 88—24)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to an optical instrument for use in transferring detail from one medium to another.

The instrument of this invention has particular application in its use by cartographers or sketchers in tracing the topography of vertical aerial photographs on a map base, manuscript, or copy sheet. It will, however, be clear from an understanding of the present disclosure that the instrument of this invention is also useful in other detail transferring operations, such as, the transfer of detail from one map to a second map, from a drawing to a map, and from one drawing to a second drawing. The instrument is useful in transferring detail to the copy sheet with or without change in scale, and with correction of distortions in the object being copied. The instrument also has obvious usefulness in the photographing of a composite picture from two media.

Since the instrument of this invention is particularly useful in the making of maps from vertical aerial photographs, the invention is described and shown in such use for purposes of illustration.

It is well known that a vertical aerial photograph is one in which the optical axis of the taking camera at the time of exposure is intended to be in a vertical position with the exposed film in a horizontal position. The vertical photograph is taken with a camera which is so mounted on an aircraft that in normal flight with perfect flying conditions the camera optical axis is in a vertical line. However, the aircraft at the time of camera exposure may assume a somewhat angular position relative to normal flying position as the result of air currents, air pockets, and other conditions of the atmosphere. With the aircraft in such angular (tilted) position at the time of camera exposure, the camera optical axis will be in a corresponding position of tilt and the details of the resulting photograph will have the same tilt in both direction and degree.

In aerial photography, it is often the practice to provide an aircraft with a set of three cameras. One camera provides the previously described vertical photograph. Each of the other two cameras provides an oblique photograph; that is, each of these two cameras is so mounted on the aircraft that its optical axis, under normal flying conditions, is in an oblique position. Usually, the two oblique cameras are stationed at opposite sides of the vertical camera, the optical axes of the two oblique cameras forming an angle of 120° which is bisected by the optical axis of the vertical camera.

All of the features and details of this disclosure and invention are useful in an instrument for transferring detail from a vertical aerial photograph to a map base or copy sheet. Certain of these features and details are also useful in an instrument for use in transferring detail from an oblique aerial photograph to a map base or copy sheet.

In the use of the present instrument, the sketcher views the map base section being sketched through the instrument and observes an image of the photograph which appears to be disposed in the plane of the map base. The photograph image is traced on the map base. When sketched, the map details register with the corresponding details of the photograph image.

The invention provides a relatively simple, portable and compact instrument which enables its user to transfer detail from a vertical aerial photograph to a map base readily and accurately. Such transfer may be secured with or without change in scale, and with any tilt of the photograph rectified. The instrument in rectifying photograph tilt provides an untilted, or transformed perspective projection of the photograph image which apparently is disposed in the plane of the map base. The tilt correction enables the sketcher to draw the map as if the photograph had been taken with the optical axis of the camera in a true vertical line. Rectification of the photograph tilt, or adjustment of the map scale is obtained by adjustment of the instrument without change of the optical distance from the perspective point to the photograph and without change in the relation of the optical elements of the instrument and the photograph placed therein.

It is, therefore, an object of this invention to provide a portable, lightweight, compact, and efficient optical instrument which is particularly well adapted for use in transferring detail from a vertical aerial photograph to a map base and which is also useful generally in transferring the detail of various objects to a copy sheet or manuscript.

Another object is to provide an optical transfer instrument in which the optical relation of the perspective point to the object being copied remains fixed during adjustments of the instrument relative to the copy sheet for either tilt or scale.

Still another object is to provide an optical transfer instrument having novel, simple and efficient means for adjusting scale, and/or rectifying tilt in its use for transferring detail of an object to a copy sheet.

A further object is to provide an optical transfer instrument which is adjustable to rectify the tilt of a vertical aerial photograph being transferred without change in a predetermined scale.

Still another object is to provide an optical transfer instrument which is adjustable to vary the scale for transfer operations without alteration of the relation of the object being copied and the optical elements of the instruments.

A still further object is to provide a relatively small and lightweight optical transfer instrument which presents an image of the object being copied in an apparent direct and upright position on the copy sheet and which affords adequate reflection and field of view with a minimum of light shielding.

Another object is to provide a relatively small, portable optical transfer instrument which may rest on the manuscript or map base to which detail is being transferred, which allows ample working space for the sketcher, and which enables the sketcher to so view both the object and the manuscript from his sketching position that they appear in similar relative orientation. As the instrument is of small size and lightweight, it may be used with both small and large map bases and easily adjusted to the map base by sliding or orienting the instrument into desired position.

Still another object is to provide an optical transfer instrument with supporting legs so arranged and constructed that the sketcher may conveniently trace a map and also make instrument adjustments while viewing the map through the instrument.

A further object is to provide an optical transfer instrument which is capable of a wide range of adjustment as a result of its mirror arrangement, its supporting leg construction, and its use of lenses.

Other objects and advantages of this invention will be apparent from the following description, the appended claims, and the accompanying drawings, which illustrate a preferred embodiment thereof. In the drawings:

The optical system of the illustrated instrument comprises a plain mirror 10 and a semi-transparent or semi-transmitting mirror 11. The mirror 10 reflects an image of a photograph P, the reflection being received by the mirror 11. The sketcher positions his eye at the perspective point I and views a map base M through the semi-transparent mirror 11. His sighting line is a vertical line a (Fig. 5) which is the optical axis of the mirror 11. Since the mirror 11 is semi-transparent, it reflects an image of the photograph P, the reflection being observed at the perspective point I. When viewed from the perspective point I, the image of the photograph P appears to be on the surface of the map base M, providing the instrument is properly adjusted. Thus, the photograph image may be traced by the sketcher with a pencil or the like to transfer detail of the photograph P to the map base M. The mirror 10 is provided so that the observed photograph image will appear in a direct or upright position on the map base M.

The two mirrors 10 and 11 are arranged in parallel relation whereby the photograph reflection from the mirror 10 is directed along lines passing through the mirror 11. The parallel relation of the two mirrors 10 and 11 permits the photograph P to be positioned in a plane parallel to the map base M when tilt correction is not required. In a preferred form of this invention, the plane of each mirror (10 and 11) is at an angle of about 38° relative to the plane of the photograph M.

Figure 3:
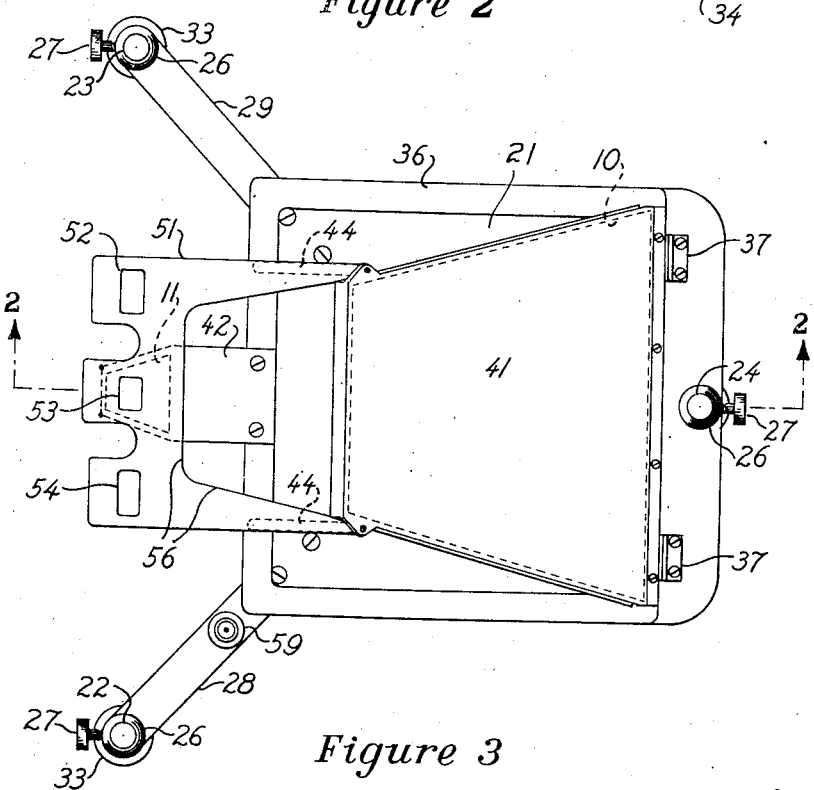
Fig. 3 is a top plan view of the instrument illustrated in Figs. 1 and 2.

The mirrors 10 and 11 are of the first (or front) surface reflecting type to avoid double image effects. The possibility of distortion may also be minimized by the use of special flat quality glass for the mirrors 10 and 11. Each mirror (10 and 11) also preferably has the shape of a trapezoid, the parallel edges being the front and rear edges with the front edge the smaller of the two (Fig. 3). The trapezoidal shape secures a wide field of view with minimum light shielding, and contributes to the lightweight and small overall size features which characterize this instrument.

The mirror 10 has its reflecting surface on its underside and toward the photograph P. The mirror 11 has its reflecting surface on its upperside and toward the perspective point I. The reflecting characteristic of the mirror 11 may be obtained by an upper surface, thin, uniform, semi-transparent coating or deposit of silver, aluminum or other metal or non-metal material having reflecting properties. This thin reflective coating or surface provides a uniform, continuous image of the photograph P over the entire field of view.

The preferred and indicated angular position, size and shape for the mirrors 10 and 11 provides approximately optimum conditions and secures certain advantages. A strained viewing angle is avoided. A wide field of vision is obtained. The short eye-to-photograph optical distance, which is secured, provides a closer view and larger image which facilitates tracing. A wide range in possible scale adjustments is also permitted. The distance from the perspective point I to the photograph P preferably matches that of the aerial camera with which the photograph is taken for the purpose of securing more accurate tilt adjustments.

A lens 12 may be used to bring the map base M into focus with the image of the photograph P. The lens 12 is mounted in a plane parallel to that of the photograph P. The lens 12 is not required when the instrument adjustments (hereinafter described) are adequate to provide an optical ratio (scale) of 1:1. Such optical ratio is obtained when the optical distance from the perspective point I to the map base M equals the optical distance from the perspective point I to the photograph P.

During use of the instrument in sketching operations, the relative positions of the mirrors 10 and 11, the lens 12 (if used), and the photograph P are fixed and are not altered by either scale or tilt corrections. The lens 12, of course, is removable, when its use is not essential, or replaceable, when a lens of different power is desired.

Figure 2:
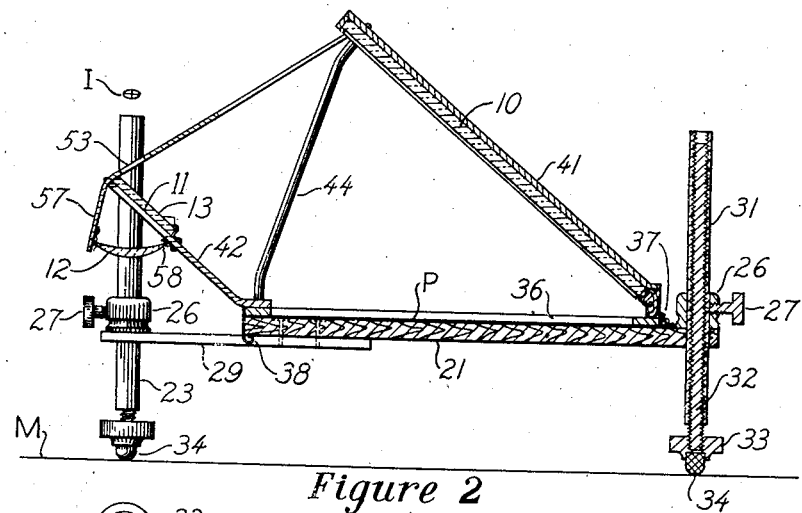
Fig. 2 is a longitudinal cross-sectional view taken on line 2—2 of Fig. 3.

The photograph P is placed on the flat upper surface of an object board or holder 21 (see Fig. 2). This board 21 is supported in elevated position over the map base M by means of a three point or tripod support in the form of three legs 22, 23 and 24, all preferably of the same construction. Each leg is so positioned that its longitudinal axis is perpendicular to the plane of the photograph P when resting on the board 21. Each leg (22, 23, 24) is slidably received within a guide or sleeve 26 and secured thereto in adjusted position by means of a thumb or set screw 27. The set of legs (22, 23, 24) may be readily removed from their guides 26 for convenient and compact storage of the instrument. The two forward leg guides 26 are mounted in extensions 28 and 29 of the object board 21. These two extensions 28 and 29 project forwardly along diverging lines from the two corners at the forward side or edge of the board 21 and form an oblique angle. The two extensions 28 and 29 may be secured to the board 21 by any suitable means and preferably are detachable from the board for convenient and compact storage of the instrument.

The two front legs 22 and 23 are widely separated to provide an unobstructed space of corresponding width for the sketcher's hands and operations in his transfer of the photograph details onto the map base M. The two front legs 22 and 23 also occupy such positions that their longitudinal axes are parallel and extend in the same plane as the optical axis $a$ (Fig. 5) of the mirror 11 and the lens 12. This axis $a$ is the vertical sighting line and, with the photograph P properly positioned on the board 21, passes through the center of the photograph image. Thus the two legs 22 and 23 provide a first tilting axis (61 in Fig. 4) which is on the surface of the map base M and intersects the optical axis $a$ at the point 63. This first tilting axis is an imaginary line extending between the extreme lower ends of the legs 22 and 23. Adjustment of the transfer instrument as a unit about the first tilting axis 61 is secured by adjusting the effective length of the rearward leg 24.

The third leg 24 and its guide 26 are positioned centrally of the rearward side of the board 21 and opposite the mirror 11 as illustrated. The leg 24 secures a second tilting axis 62 which is disposed on the surface of the map base M and which is normal to the first tilting axis 61. The two axes 61 and 62 intersect at the point 63 lying on the map base M and in the optical axis $a$. This relation of axes 61 and 62 is secured by so positioning the leg 24 that its longitudinal axis is in the plane which is normal to the tilting axis 61 (or the plane of the legs 22 and 23), which intersects the axis 61 at the point 63, and which passes through the center of the mirror 11 and the lens 12. Adjustment of the transfer instrument about the second tilting axis 62 is secured by adjusting the effective lengths of the two legs 22 and 23 equally but in opposite directions. The described and illustrated relation of the two tilting axes 61 and 62 permits tilt rectification without change in scale.

Each of the legs (22, 23 and 24) comprises a tube or hollow rod member 31 and a screw member 32 which have a threaded connection, whereby the member 32 is axially adjustable relative to the member 31. Adjustment of the screw member 32 is facilitated by a thumb wheel 33 adjacent the lower end thereof. The effective length of each leg (22, 23 and 24) may be adjusted by sliding the leg lengthwise (axially) in its guide 26, or by relative rotation of the leg members 31 and 32. The sliding leg movement permits rapid adjustment of the effective leg length for large scale changes. The threaded connection incorporated in each leg permits fine adjustments in its effective length for tilting the instrument. The range in adjustment of the effective length of each leg may correspond substantially to the overall length of the leg when the screw member 32 is in a fully extended position of adjustment relative to the member 31.

The lower end of each screw member 32 may be provided with a felt pad 34 to avoid marking of or damage to the map base M as the instrument is shifted thereon by the sketcher.

The photograph P is held in place on the object board 21 by means of a rectangular frame 36, which overlies the photograph margins. The frame 36 may be pivotally connected to the base 21 adjacent an edge thereof. In the drawings, the frame 36 is illustrated as pivotally secured to the board 21 adjacent its rearward edge and by means of hinges 37. The frame 36 may be secured in the lowered position (see Fig. 2) by any suitable means, which may be in the form of a spring latch device 38.

The two mirrors 10 and 11 and the lens 12 are relatively mounted in fixed relation, which fixed relation may be accomplished by mounting them on the frame 36. The mirror 10 is supported by a mirror holder 41 which is rigidly connected to the frame 36 adjacent its rear edge. The mirror 10 and its holder 41 extend forwardly and upwardly and overlie the photograph P resting on the object board 21. The mirror 11 is held by a frame member 42 which supports the marginal portions of the mirror 11 and exposes both faces thereof as illustrated in the drawings. The mirror frame 42 is secured to the front side of the photograph frame 36 and projects forwardly in a plane parallel to the plane of the mirror 10.

A member 51 which may be of sheet material, such as metal, serves a number of functions. The member 51 serves as an eye piece and is provided with three eye openings 52, 53 and 54. The opening 53 overlies the semi-transparent mirror 11 and is the viewing opening through which the map M and the image of the photograph P are observed in sketching. If desired, the eye openings 52 and 54, when their use is not desired, may be masked or covered by adhesive tape or other means.

The member 51 also serves as a brace for the mirror frame 42. For such purpose, the member 51 extends between and is secured to both the front edge of the mirror frame 42 and the front edge of the mirror frame 41. The member 51 is cut away, as illustrated in the drawings, to provide an opening 56 through which the sketcher may view the photograph P from a point adjacent the perspective point I.

A downwardly bent forward portion 57 of the member 51 and a spring clip 58, which are mounted on the mirror holder 42, provide a support for the lens 12. The resiliency of the clip 58 permits the lens 12 to be readily removed from its support, or replaced by a lens of different power, as occasion may require.

The part 55 of the member 51 may be used as a headrest for the sketcher in his use of the instrument.

The member 51 may be formed without the eye openings 52 and 54. However, these openings enable the stretcher to view the map M with both eyes and thereby obtain a better and stereoscopic view of the map base M and the pencil used in the tracing operation. The sketcher may use either eye openings 52 and 53 at the same time, or eye openings 53 and 54.

Similar lenses 12 may be provided for the two eye openings being used at any time.

When the frame 36 is lowered and secured by the spring latch device 38, the object board 21, the photograph P, the mirrors 10 and 11, and the lens 12 (when used) are rigidly assembled in fixed relation.

A level indicator 59, such as a spherical bubble, may be provided on the instrument to assist the sketcher in adjusting the instrument for tilt or to a zero tilt position.

The mirror frame 41, if desired, may be further braced by means of the rods 44 extending from the forward part of the frame 36.

Operation

The map base or manuscript M, to which detail is to be transferred, is preferably placed on a flat, level surface such as a horizontal table top or drawing board. The instrument of this invention is useful with both small and large map bases M. When the map base M is small, the instrument will rest directly on the table top. When the map base M is relatively large, the instrument will rest directly on the map base M (see Fig. 4).

The map base M and the instrument are so oriented that the sketcher, by placing his viewing eye at the perspective point I and directly over the eye opening 53 and the semi-transparent mirror 11, may view the photograph image and the corresponding section or area of the map base M. If a small map base M is used, orientation may be secured by shifting or sliding either the map base M or the instrument on the surface of the table top. If a large map base M is used, the instrument may be shifted over the surface of the map base M to secure proper orientation.

The photograph P is positioned on the object board 21 and held in place by the frame 36. A preferred positioning of the photograph P is one in which the ray of light $r$ (Fig. 5) from the center of the photograph P and perpendicular to the plane thereof will pass through the perspective point I of the instrument as it does in aerial cameras. This positioning of the photograph P enables the sketcher to secure a more accurate adjustment of the instrument to rectify photograph tilt.

Figure 1:
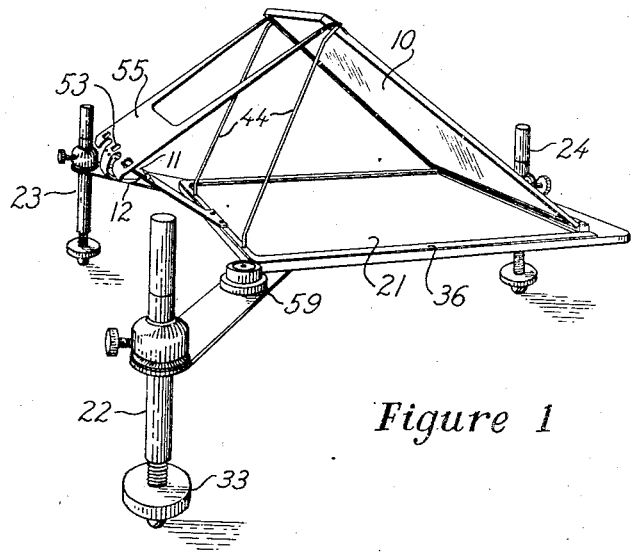
Fig. 1 is a perspective view of an instrument embodying the present invention.
Figure 4:
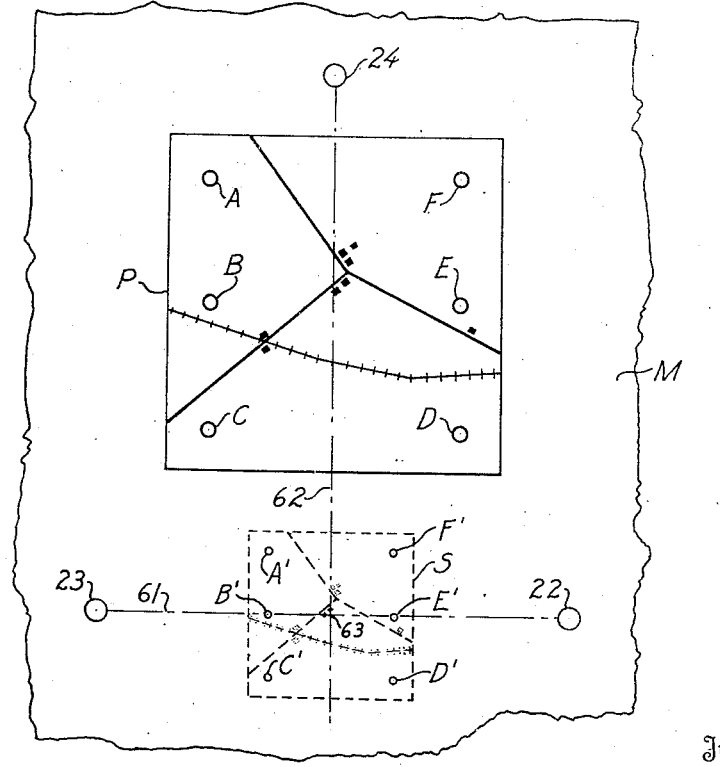
Fig. 4 is a more or less diagrammatic plan view to show the position of the photograph being reproduced, the position of the instrument legs, and the positions of the map and its area in which the photograph is being copied.

A diagrammatic illustration of the use of the instrument in transferring detail of a photograph P on reduced scale to a section S of a large map base M is shown in Fig. 4. This figure (4) indicates the relative positions of the instrument legs 22, 23, and 24, the photograph P, and the section S of the map base M in which features or details of the photograph P are to be reproduced. The map base section S also shows in dotted or broken lines the photograph image as it will appear to the sketcher when the instrument is properly adjusted.

As a guide for securing accuracy in the making of aeronautical maps from a plurality of aerial photographs, each photograph P is provided with reference marks or points, such as the marks A, B, C, D, E, and F. The map section S corresponding to a particular photograph is provided with similarly arranged reference marks or points $A^1$, $B^1$, $C^1$, $D^1$, $E^1$ and $F^1$. Before the sketcher traces the map section S, reference points of the photograph image are brought into registry with corresponding points in the map section S. The points are brought into registry by adjustment of the legs 22, 23 and 24.

If the photograph is free of tilt, the two sets of reference points (those of the photograph and of the map base section S) are made to coincide by adjusting all three legs 22, 23, and 24 to support the object board 21 (and the photograph P) in a horizontal position at the proper elevation. For large scale adjustments, the legs are adjusted lengthwise in the guides 26. Small scale adjustments may be secured by turning the leg thumb wheels 33. As the height of the instrument is increased, the map base reference points will appear to converge. As the height is decreased, the map base reference points will appear to diverge. Thus the two sets of reference points may be rapidly brought into registry while the sketcher views the map base section S through the mirror 11.

Figure 5:
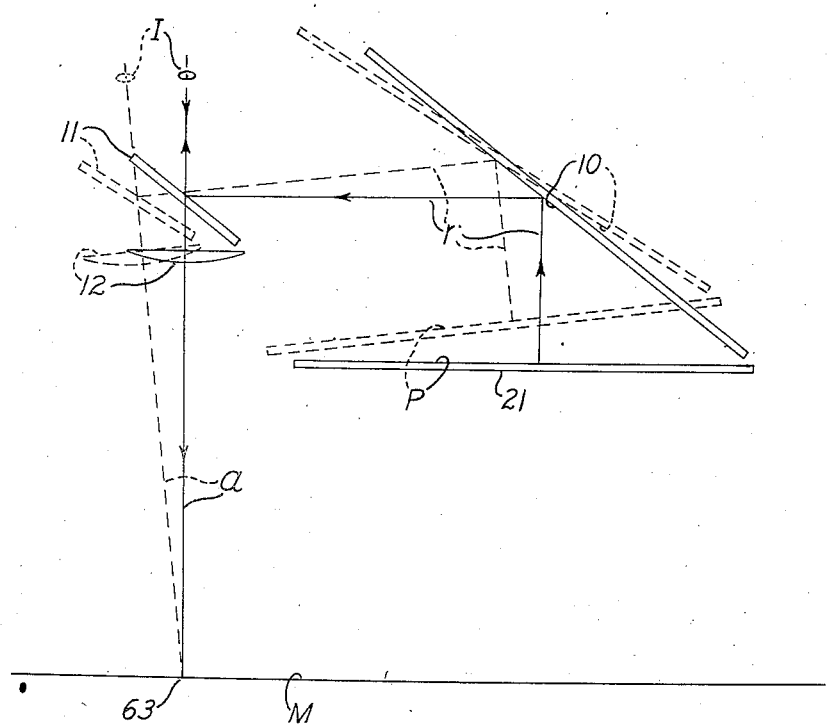
Fig. 5 is a diagrammatic view to illustrate a tilting adjustment of the instrument of Figs. 1 through 3.

If the photograph details are tilted, the tilt is rectified by tilting the instrument about either or both of the axes 61 and 62. As previously explained and as diagrammatically illustrated in Fig. 5, the instrument is tilted without any change in the relation of the mirrors 10 and 11, the lens 12 (if used), the photograph P, and the object board 21. The tilting is also secured without change in the scale or optical ratio. Fig. 5 shows in solid lines the optical system, the board 21 and the photograph P in a first position prior to tilting of the instrument relative to the map base M. Rectification of tilt in one direction is secured by adjusting the leg 24 to increase its effective length and thereby tilt the instrument forwardly about the axis 61 (Fig. 4). This tilting adjustment of the instrument may place the optical system, the photograph P, and the object board 21 in the position indicated in broken lines in Fig. 5. The relatively large angular relation of the full line and broken line positions in Fig. 5 is selected for purposes of illustration. Usually, the angular adjustment will be of a lesser degree.

Lateral tilting of the instrument is secured by adjusting the legs 22 and 23 to the same extent in opposite direction and without alteration of the fixed relation of the optical system, the photograph P, and the object board 21.

A horizontal positioning of the photograph plane is provided for those cases in which the photograph P was made with a camera having its optical axis in a true vertical line. For the purpose of rectifying the tilt of a vertical aerial photograph and securing an untilted projection of the photographic details, the instrument is adjusted to tilt the plane of the photograph to a degree and in a direction corresponding to the tilt of the camera at the time of its exposure in taking such photograph. Tilt correction seldom exceeds a five degree angle and averages about a one degree angle.

The instrument adjustment is satisfactory and the instrument is properly oriented when reference points or marks on the photograph P appear to coincide nearly or completely with corresponding reference points or lines on the map base M. If all the reference points in the photograph P had the same elevation, it would be possible to make them all coincide exactly with the points on the map base M. If the terrain of a photograph has an even slope, tilt can be introduced into the photograph until it is parallel to the ground surface.

Adjustment of the illumination (not shown) for the instrument is desirable. A right-handed sketcher will prefer to have the light originating from a source on the left-hand side of the instrument. While orienting the instrument, it is recommended that more light be directed on the map base M than on the photograph P. For sketching, more light is directed on the photograph P.

The lens 12 is unnecessary and is preferably removed when the selected scale for the transfer is one to one. Such scale may be secured by adjustment of the legs 22, 23, and 24. Under other conditions, the lens 12 is used to avoid parallax, to bring the image of map base M into focus with the photograph P, and to increase the range of the instrument. A minus lens is used in sketching a map on larger scale than the photograph and when the optical ratio (the ratio of the geometrical distance from sketcher's eye to the photograph P to the geometrical distance from sketcher's eye to map base M) is less than one to one (1:1). A plus lens is used in sketching a map on reduced scale and when the optical ratio is greater than one to one (1:1).

Eyestrain is avoided by having both eyes of the sketcher remain open. If this practice is confusing, a mask may be placed on the instrument in front of the eye that is not being used for sketching.

The detail is now ready for sketching. The desired detail is transferred to the map base M, preferably with a pencil. The instrument may be shifted slightly to bring individual reference points into exact register as the detail in its vicinity and at equal elevation is being sketched. For example, when tracing a stream hold to the points on or near that feature. Likewise, a ridge is traced when points on its crest are in register. If there are no points on a feature, a skilled operator can adjust between points of various elevation. The work of transferring detail may be extended out to the edge of a vertical photograph.

The instrument permits the sketcher to rest his head on the member 55 with his eye at the observation point I. This head position may be maintained during the sketching operation and also during adjustment of the instrument legs or the instrument relative to the map base M. The sketcher may also view the photograph P by slightly tilting his head from its position of rest on the instrument.

The foregoing is to be understood as illustrative, since this invention includes all modifications and embodiments coming within the scope of the appended claims.

I claim:

1. In an instrument for use in transferring detail from a first medium to a second medium, said instrument being adapted to rest on the second medium or the support, such as a table, for the second medium, said instrument comprising: a rigid assembly of a base for supporting the first medium, and optical means through which said second medium is viewed, said optical means providing a reflection of said first medium which appears as a virtual image; and means for spacing said assembly as a unit in elevated position relative to said second medium and adapted to rest slidably on said second medium, said spacing means being adjustable to vary the optical distance from said optical means to said second medium and to thereby position said virtual image as apparently on the surface of said second medium.

2. In an instrument for use in transferring detail from a first medium to a second medium, said instrument comprising: a rigid assembly, and three legs for supporting said assembly in elevated position relative to the second medium; said assembly having an object board for supporting the first medium, and optical means through which said second medium is viewed, said optical means providing a reflection of said first medium which appears as a virtual image on the surface of said second medium; each of said legs being adjustable to vary the effective length thereof, the relative positioning and the adjustment of said legs providing two axes about which said assembly is selectively tiltable for adjustment.

3. In an instrument for use in transferring detail from a first medium to a second medium, said instrument comprising: a rigid assembly, and three legs for supporting said assembly in elevated position relative to the second medium; said assembly having an object board for supporting the first medium, a first means for reflecting an image of said first medium, and a second means having both light-transmitting and light-reflecting characteristics to receive the reflection of said first means; said second medium being adapted to be viewed through said second means; each of said legs being adjustable to vary the effective length thereof, the relative positioning and the adjustment of said legs providing two axes about which said rigid assembly is selectively tiltable for adjustment.

4. In an instrument for use in transferring detail from a first medium to a second medium, said instrument comprising: a rigid assembly of an object board for supporting the first medium, a plain mirror positioned to reflect an image of said first medium, and a semi-transparent mirror positioned to receive the reflection of said plain mirror; and three spaced legs for supporting said rigid assembly in elevated position relative to the second medium with said second medium adapted to be viewed through said semi-transparent mirror, each of said legs being adjustable to vary the effective length thereof, the positioning and adjustment of said three legs providing two axes about which said rigid assembly is selectively tiltable for adjustment, said two axes being perpendicular to each other and intersecting in the optical axis of said semi-transparent mirror.

5. In an instrument for use in transferring detail from a first medium to a second medium, said instrument comprising: a rigid assembly of an object board for supporting the first medium, a plain mirror positioned to reflect an image of said first medium, a semi-transparent mirror positioned to receive the reflection of said plain mirror, and a lens interposed between said semi-transparent mirror and said second medium with the optical axis of said lens coinciding with the optical axis of said semi-transparent mirror; and three spaced legs for supporting said rigid assembly in elevated position relative to the second medium with said second medium adapted to be viewed through said semi-transparent mirror and lens, each of said legs being adjustable to vary the effective length thereof, the positioning and adjustment of said three legs providing two axes about which said rigid assembly is selectively tiltable for adjustment, said two axes being perpendicular to each other and intersecting in the optical axis of said semi-transparent mirror and said lens.

6. In an instrument for use in transferring detail from a first medium to a second medium, said instrument comprising: a rigid assembly of an object support, means providing a reflecting mirror surface, and means providing a semi-transparent mirror surface; and means for slidably resting on said second medium to support said rigid assembly in an elevated position and providing two axes about which said rigid assembly is tiltable for adjustment, said two axes being perpendicular to each other and intersecting in the optical axis of said semi-transparent mirror.

7. In an instrument for use in transferring detail from a first medium to a second medium, said instrument comprising: an object board for supporting said first medium, a plain mirror extending forwardly from adjacent the rearward side of said board and at an acute angle thereto for reflecting an image of said first medium, a semi-transparent mirror adjacent the forward side of said board and in position to receive the reflection of said plain mirror, means for maintaining a fixed relation of said board, said plain mirror and said semi-transparent mirror in use of the instrument, and three legs for supporting said board in an elevated position with said semi-transparent mirror overlying the second medium, each of said legs being adjustable to vary the effective length thereof, the adjustments and relative positioning of said legs providing two tilting axes intersecting in the optical axis passing through said semi-transparent mirror to said second medium.

8. In an instrument of the character described, the combination comprising: an object board having a flat, upper surface for supporting a photograph, drawing, or the like; three legs depending from said board to support said board in an elevated horizontal position above a table or the like, each leg being positioned perpendicular to said board and being adjustable to vary the effective length thereof; a plain mirror mounted on said board with the mirror extending angularly to said board from adjacent the rearward side thereof to overlie said board upper surface; and a semi-transparent mirror mounted on said board and extending forwardly of the front side thereof in parallel relation with said plain mirror.

9. An instrument as defined in claim 8, wherein two of said three legs extend in a plane normal to a second plane including the third leg and passing through the semi-transparent mirror, the line of intersection of the two planes coinciding with an observation line passing through said semi-transparent mirror, whereby the object board is adjustable vertically from one to another horizontal position and also is tiltable into and out of horizontal position about two axes with the optical distance from the semi-transparent mirror to the surface of the table remaining fixed.

10. An instrument as defined in claim 8, wherein the plain mirror has a trapezoidal shape with the smaller of the two parallel sides forming the forward mirror edge.

11. In an instrument of the character described, the combination comprising: an object board member having two forward extensions forming an oblique angle; a frame member pivotally secured to said board member for holding an object, such as a photograph, drawing or the like, in a flat condition against the upper surface of said board member; two forwardly inclined parallel mirrors, respectively, secured to one of said members adjacent the forward and rearward sides thereof; the rearward mirror being a plain mirror overlying said board member to reflect an image of said object, the forward mirror being semi-transparent and in the path of reflection from said plain mirror; and three legs for supporting said board horizontally and in elevated position relative to a copy sheet, two of said legs being secured, respectively, to said board member extensions, the third one of said three legs being secured to said board member adjacent the rearward side thereof and opposite said semi-transparent mirror.

12. An instrument as defined in claim 11, wherein each leg has its axis perpendicular to the plane of the board member object-receiving surface is axially adjustable relative to said board member, and includes two parts having threaded connection for providing a fine adjustment of the effective length of the leg, the legs of the two extensions lying in a plane normal to a second plane including the third leg and passing through the semi-transparent mirror, the line of intersection of the two planes coinciding with an observation line passing through said semi-transparent mirror.

13. An instrument as recited in claim 11, wherein the member supporting the two mirrors also supports a lens in a position below the semi-transparent mirror and parallel to the plane of the board member object-receiving surface, with the optical axis of the lens coinciding with the optical axis of said semi-transparent mirror.

14. In an instrument of the character described to rest on a copy sheet or the surface supporting such sheet, the combination comprising: an object board providing a flat, supporting surface for the object to be copied, a mirror of trapezoidal shape for reflecting an image of said object, the wider of the two parallel sides of the trapezoidal mirror being the side near said board, a semi-transparent mirror for receiving the reflection of said trapezoidal mirror, means connecting said board and mirrors to provide a rigid assembly thereof, and three spaced, parallel legs depending from said assembly, each of said legs being adjustable to vary the effective length thereof, the adjustment of said legs being adapted to raise and lower said assembly as a unit relative to the copy sheet and being also adapted to tilt selectively said assembly as a unit about two axes perpendicular to each other.

15. In an instrument of the character described to rest on a copy sheet or the surface supporting such sheet, the combination comprising: a rigid assembly of a board providing a flat, supporting surface for the object to be copied, and a mirror having both light transmitting and light reflecting characteristics; and three legs for supporting said assembly; one of said legs being secured to said assembly rearwardly of said base and opposite to said mirror; the other two of said three legs being widely spaced, being at opposite sides of said mirror, and lying in a plane passing through said mirror and normal to the plane including said one leg and passing through said mirror; each of said legs being adjustable to vary the effective length thereof, the adjustment of said legs being adapted to raise and lower said assembly as a unit relative to the copy sheet and being also adapted to tilt selectively said assembly as a unit about two axes perpendicular to each other.

JAMES L. BUCKMASTER.